United States Patent
Li et al.

(10) Patent No.: US 10,114,944 B1
(45) Date of Patent: Oct. 30, 2018

(54) SYSTEMS AND METHODS FOR CLASSIFYING PERMISSIONS ON MOBILE DEVICES

(71) Applicant: Symantec Corporation, Mountain View, CA (US)

(72) Inventors: Jinghao Li, Los Angeles, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 14/938,874

(22) Filed: Nov. 12, 2015

(51) Int. Cl.
 *H04L 9/00* (2006.01)
 *G06F 21/52* (2013.01)

(52) U.S. Cl.
 CPC ........ *G06F 21/52* (2013.01); *G06F 2221/033* (2013.01)

(58) Field of Classification Search
 CPC ........................................... G06F 21/52
 USPC ............................................. 726/17
 See application file for complete search history.

(56) References Cited

U.S. PATENT DOCUMENTS

| | | | |
|---|---|---|---|
| 8,726,392 B1 | 5/2014 | McCorkendale et al. | |
| 9,230,099 B1 | 1/2016 | McCorkendale et al. | |
| 9,386,463 B1* | 7/2016 | Contino | H04W 24/02 |
| 2006/0168213 A1 | 7/2006 | Richardson et al. | |
| 2006/0230439 A1 | 10/2006 | Smith et al. | |
| 2009/0249492 A1 | 10/2009 | Boesgaard Sorensen | |
| 2011/0231936 A1 | 9/2011 | Williams et al. | |
| 2012/0222109 A1* | 8/2012 | Calcaterra | G06F 21/54 726/17 |
| 2013/0196649 A1* | 8/2013 | Paddon | H04M 1/66 455/423 |
| 2013/0212684 A1* | 8/2013 | Li | G06F 17/30522 726/25 |
| 2014/0205099 A1 | 7/2014 | Christodorescu et al. | |
| 2016/0044049 A1* | 2/2016 | Xing | H04L 63/14 726/23 |
| 2016/0337390 A1* | 11/2016 | Sridhara | G06F 3/0484 |

OTHER PUBLICATIONS

"DexGuard", http://www.saikoa.com/dexguard, as accessed Mar. 25, 2014, (May 31, 2012).

(Continued)

*Primary Examiner* — Christopher J Brown
(74) *Attorney, Agent, or Firm* — FisherBroyles, LLP

(57) ABSTRACT

The disclosed computer-implemented method for classifying permissions on mobile devices may include (1) detecting that an application executing on a mobile device is issuing a request for one or more requested permissions to access one or more components of the mobile device, (2) determining an intended use of the application, (3) performing, through a security system distinct from the application and the operating system, an analysis of the request issued by the application at least in part by determining whether the intended use of the application corresponds to an expected use of the requested permission, and (4) providing, via a graphical user interface, a result of the analysis to an end user of the mobile device that indicates a security implication caused by granting the one or more requested permissions to the application. Various other methods, systems, and computer-readable media are also disclosed.

20 Claims, 7 Drawing Sheets

(56) References Cited

OTHER PUBLICATIONS

Constantin, Lucian, "New Android Trojan app exploits previously unknown flaws, researchers say", http://www.computerworld.com/s/article/9239913/New_Android_Trojan_app_exploits_previously_unknown_flaws_researchers_say?taxonomyId=17, as accessed Mar. 25, 2014, Computerworld Inc., (Jun. 7, 2013).

Xiaole Zhu, et al.; Systems and Methods for Determining Whether Transmission of Sensitive Data is Expected; U.S. Appl. No. 14/283,824, filed May 21, 2014.

* cited by examiner

SYSTEMS AND METHODS FOR CLASSIFYING PERMISSIONS ON MOBILE DEVICES

BACKGROUND

As mobile devices and applications increase in prevalence and sophistication, applications increasingly seek permission to access various components of mobile devices. Moreover, operating systems for mobile devices are increasingly permitting users to custom-tailor what permissions they grant to a particular application. Users may wish to restrict what types of information or hardware an application is permitted to access. For example, a user may wish to allow a social media platform to access geolocation information in order to "check in" at specific locations. As an additional example, a user may wish to block a social media platform from accessing the contacts list on the mobile device. As applications and mobile devices increase in sophistication, however, deciding what permissions to grant and which to deny may become an absurdly byzantine process.

The increasing prevalence of third-party libraries for purposes such as in-app advertising provides many examples in which selecting application permissions can be confusing to an end user. For example, denying a mobile application's access to device ID may interfere with crash and error reporting. Alternatively, denying an application's access to device ID may prevent the application from forwarding that information to a third-party library involved in advertising. Moreover, a hijacked application may insert spurious permission requests for the purposes of stealing a user's information. Accordingly, the instant disclosure identifies and addresses a need for additional and improved systems and methods for classifying permissions on mobile devices.

SUMMARY

As will be described in greater detail below, the instant disclosure describes various systems and methods for classifying permissions on mobile devices by classifying permissions and applications according to intent categories and using those intent categories as part of an analysis to determine if the application would be expected to request a particular permission. The systems and methods disclosed herein may also identify potential security risks inherent in granting a particular permission and then report this information in a concise, easy-to-read format to the end user of a mobile device, allowing the user to make an informed decision as to whether or not they wish to grant the application access to the permission. The analysis may be performed in a variety of ways, including directly on the mobile device or in conjunction with a backend server that skims permission request information from many mobile devices.

In one example, a computer-implemented method for classifying permissions on mobile devices may include (1) detecting that an application executing on a mobile device is issuing a request for one or more requested permissions to access one or more components of the mobile device through an operating system of the mobile device, (2) determining an intended use of the application, (3) performing, through a security system distinct from the application and the operating system, an analysis of the request issued by the application at least in part by determining whether the intended use of the application corresponds to an expected use of the requested permission, and (4) providing, via a graphical user interface, a result of the analysis to an end user of the mobile device that indicates a security implication caused by granting the one or more requested permissions to the application. In one embodiment, the component of the mobile device may include (1) information stored on the mobile device, (2) a hardware component of the mobile device, (3) a network interface of the mobile device, and/or (4) an application programming interface of the mobile device.

In some examples, the computer-implemented method may further include identifying a permission intent category of the requested permission that describes the expected use of the requested permission. In such examples, determining the intended use of the application may include identifying an application intent category of the application. The application intent category may be used to classify applications that are similar to each other based on intended use. Performing the analysis of the request may include comparing the permission intent category to the application intent category. Identifying the permission intent category of the requested permission may additionally or alternatively include performing a static analysis of code of the application and/or querying an application store that hosts the application.

In some examples, performing the analysis of the request may include determining, across a mobile devices, a frequency at which various instances of the application request the requested permission and/or a frequency at which instances of the application utilize the requested permission. Additionally or alternatively, performing the analysis of the request may include comparing permissions requested by a previous version of the application to permissions requested by a current version of the application. In a similar vein, the computer-implemented method may further include compiling a list of permissions requested by various instances of the application that each executed on a separate mobile device. In such examples, performing the analysis of the request may include determining, by searching the list of permissions, whether any application instance has previously requested the requested permission. Moreover, the computer-implemented method may further include compiling a list of permissions requested by other applications that are classified under a same intent category as the application. In these examples, performing the analysis of the request may include determining, by searching the list of permissions, whether any of the other applications have previously requested the requested permission. Performing the analysis of the request may additionally or alternatively include determining that denying access to the requested permission will not adversely affect intended operation of the application. In one embodiment, the result of the analysis may include a trust score for the requested permission that indicates a level of confidence in the requested permission being safe to grant to the application.

In one embodiment, a system for implementing the above-described method may include (1) a detection module, stored in memory, that detects that an application executing on a mobile device is issuing a request for one or more requested permissions to access one or more components of the mobile device, (2) a determination module, stored in memory, that determines an intended use of the application, (3) a performing module, stored in memory, that performs, through a security system distinct from the application and the operating system, an analysis of the request issued by the application at least in part by determining whether the intended use of the application corresponds to an expected use of the requested permission, (4) a providing module, stored in memory, that provides, via a graphical user interface, a result of the analysis to an end user of the mobile device that indicates a security implication caused by granting the one or more requested permissions to the application, and (5) at least one physical processor configured to execute the detection module, the determination module, the performing module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect that an application executing on a mobile device is issuing a request, through an operating system of the mobile device, for one or more requested permissions to access one or more components of the mobile device, (2) determine an intended use of the application, (3) perform, through a security system distinct from the application and the operating system, an analysis of the request issued by the application at least in part by determining whether the intended use of the application corresponds to an expected use of the requested permission, and (4) provide, via a graphical user interface, a result of the analysis to an end user of the mobile device that indicates a security implication caused by granting the one or more requested permissions to the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
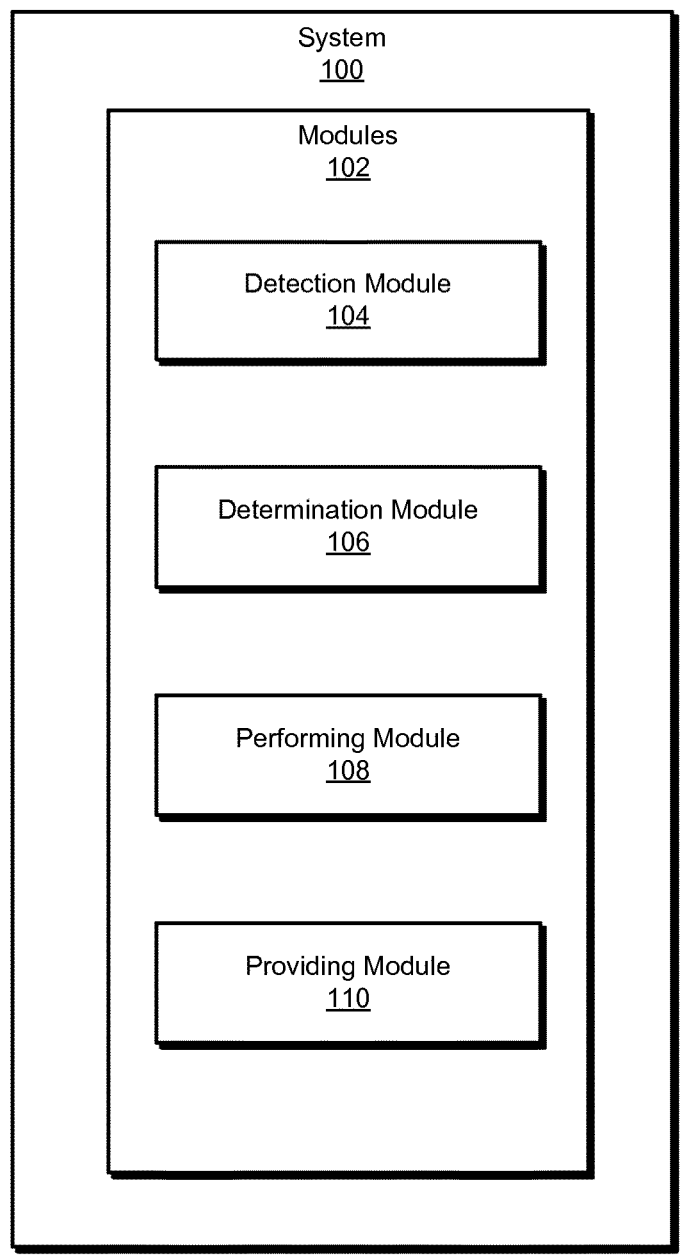
FIG. 1 is a block diagram of an exemplary system for classifying permissions on mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for classifying permissions on mobile devices. As will be explained in greater detail below, systems and methods described herein may efficiently identify and communicate to end users security implications caused by granting an application specific permissions by comparing the expected use of the application to the expected use of the permissions in question. For example, systems and methods described herein may be able to detect if a particular copy or instance of an application has been hijacked by comparing permissions that the application is actually requesting to a list of permissions that the application might be expected to request.

Figure 2:
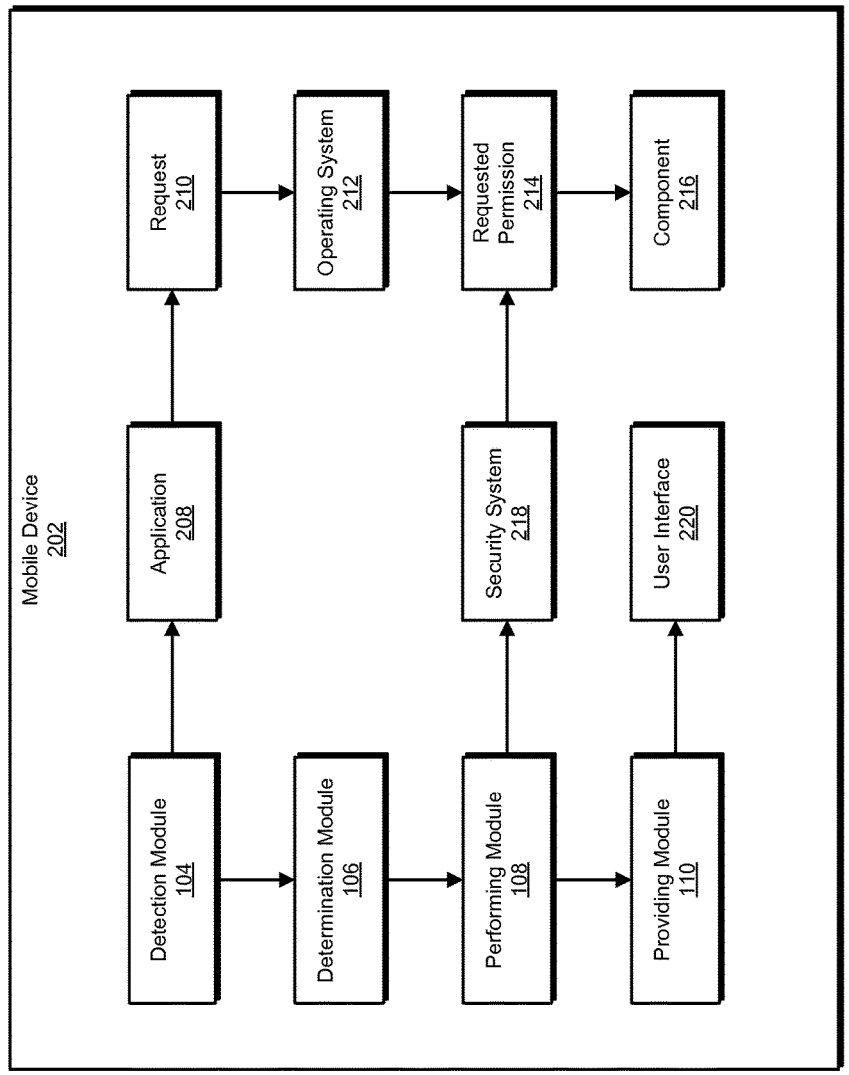
FIG. 2 is a block diagram of an additional exemplary system for classifying permissions on mobile devices.

The following will provide, with reference to FIGS. 1-2, detailed descriptions of exemplary systems for classifying permissions on mobile devices. Detailed descriptions of corresponding computer-implemented methods will also be provided in connection with FIG. 3. Detailed descriptions of an exemplary system for classifying permissions on mobile devices that utilizes a backend analysis system will be provided in connection with FIG. 4, and detailed descriptions of an exemplary user interface will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for classifying permissions on mobile devices. As illustrated in this figure, exemplary system 100 may include one or more modules 102 for performing one or more tasks. For example, and as will be explained in greater detail below, exemplary system 100 may include a detection module 104 that detects when an application executing on a mobile device issues a request, through an operating system of the mobile device, for one or more requested permissions to access one or more components of the mobile device. Exemplary system 100 may additionally include a determination module 106 that determines an intended use of the application. Exemplary system 100 may further include a performing module 108 that performs, through a security system distinct from the application and the operating system, an analysis of the request issued by the application at least in part by determining whether the intended use of the application corresponds to an expected use of the requested permission. Furthermore, exemplary system 100 may include a providing module 110 that provides, via a graphical user interface, a result of the analysis to an end user of the mobile device that indicates a security implication caused by granting the one or more requested permissions to the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2

Figure 6:
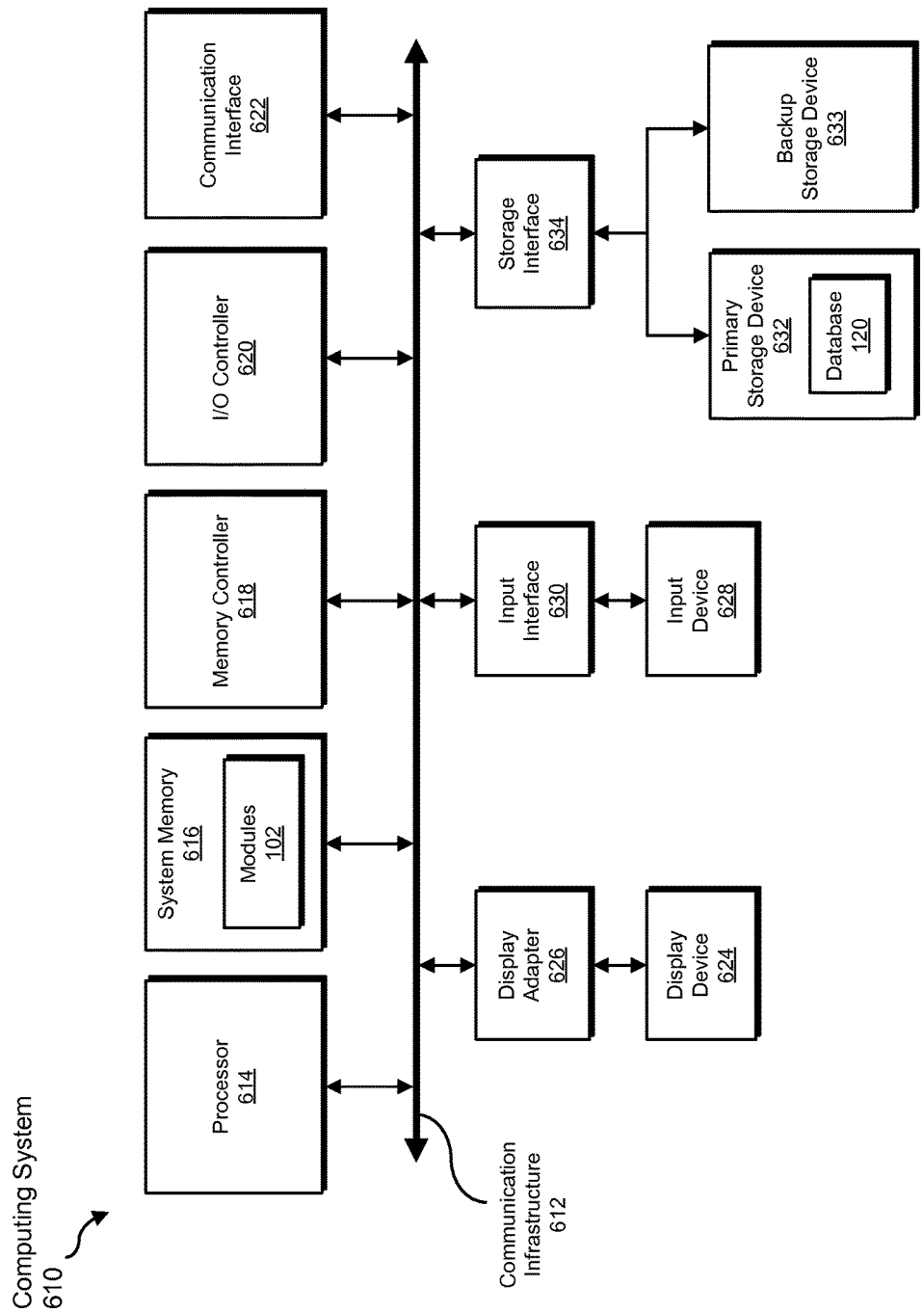
FIG. 6 is a block diagram of an exemplary computing system capable of implementing one or more of the embodiments described and/or illustrated herein.
Figure 7:
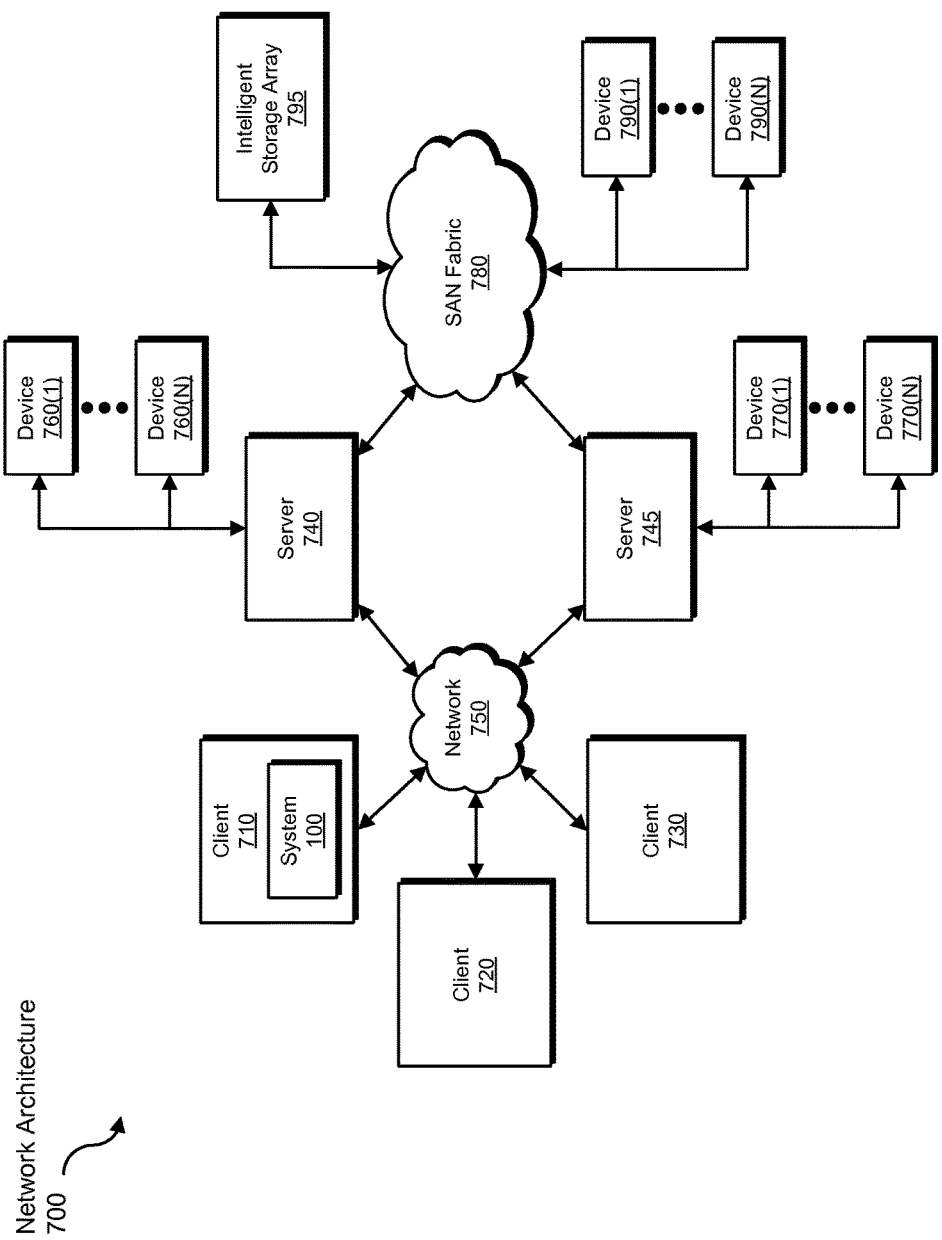
FIG. 7 is a block diagram of an exemplary computing network capable of implementing one or more of the embodiments described and/or illustrated herein.

(e.g., mobile device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile device 202. In one example, mobile device 202 may be programmed with one or more of modules 102. Additionally or alternatively, a security system backend (such as security system backend 502 in FIG. 4) may be programmed with one or more of modules 102.

In one embodiment, one or more of modules 102 from FIG. 1 may, when executed by at least one processor of mobile device 202 and/or security system backend 502, enable mobile device 202 and/or security system backend 502 to identify permissions likely to be requested by a mobile application and inform a user of the mobile device of potential risks associated with granting various permissions to the application. For example, and as will be described in greater detail below, one or more of modules 102 may cause mobile device 202 and/or security system backend 502 to classify permissions on mobile devices based on expected uses for that permission. For example, a camera component of a mobile device might be expected to be used in conjunction with apps that wish to record video (e.g., a video messaging app such as APPLE FACETIME). As will be described in greater detail below, detection module 104 may detect that an application 208 executing on a mobile device 202 is issuing a request 210, through an operating system 212 of mobile device 202, for a requested permission 214 to access a component 216 of the mobile device. Determination module 106 may determine an intended use of application 208. Performing module 108 may perform, through a security system 218 distinct from application 208 and operate system 212, an analysis of request 210 issued by application 208 at least in part by determining whether the intended use of application 208 corresponds to an expected use of requested permission 214. Providing module 110 may provide, via a user interface 220, a result of the analysis to an end user of the mobile device that indicates a security implication caused by granting the one or more requested permissions to application 208.

Mobile device 202 generally represents any type or form of computing device capable of reading computer-executable instructions. Examples of mobile device 202 include mobile phones, tablet computers, e-book readers, personal digital assistants, wearable computing devices (e.g., computing devices with a head-mounted display, smartwatches, etc.), and the like. In some examples, mobile devices may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile device and/or may interact with a mobile computing environment Application 208 generally represents software that executes on a computing device that requires access to one or more restricted components of a computing device in order to perform as expected. Such access may be controlled through the use of permissions. The term "permission," as used herein, generally refers to a clearance granted to an application by an operating system, security system, or other software. This clearance may allow the application to access hardware and/or software features of a computing device that would otherwise be blocked by the operating system, security system, etc.

Figure 3:
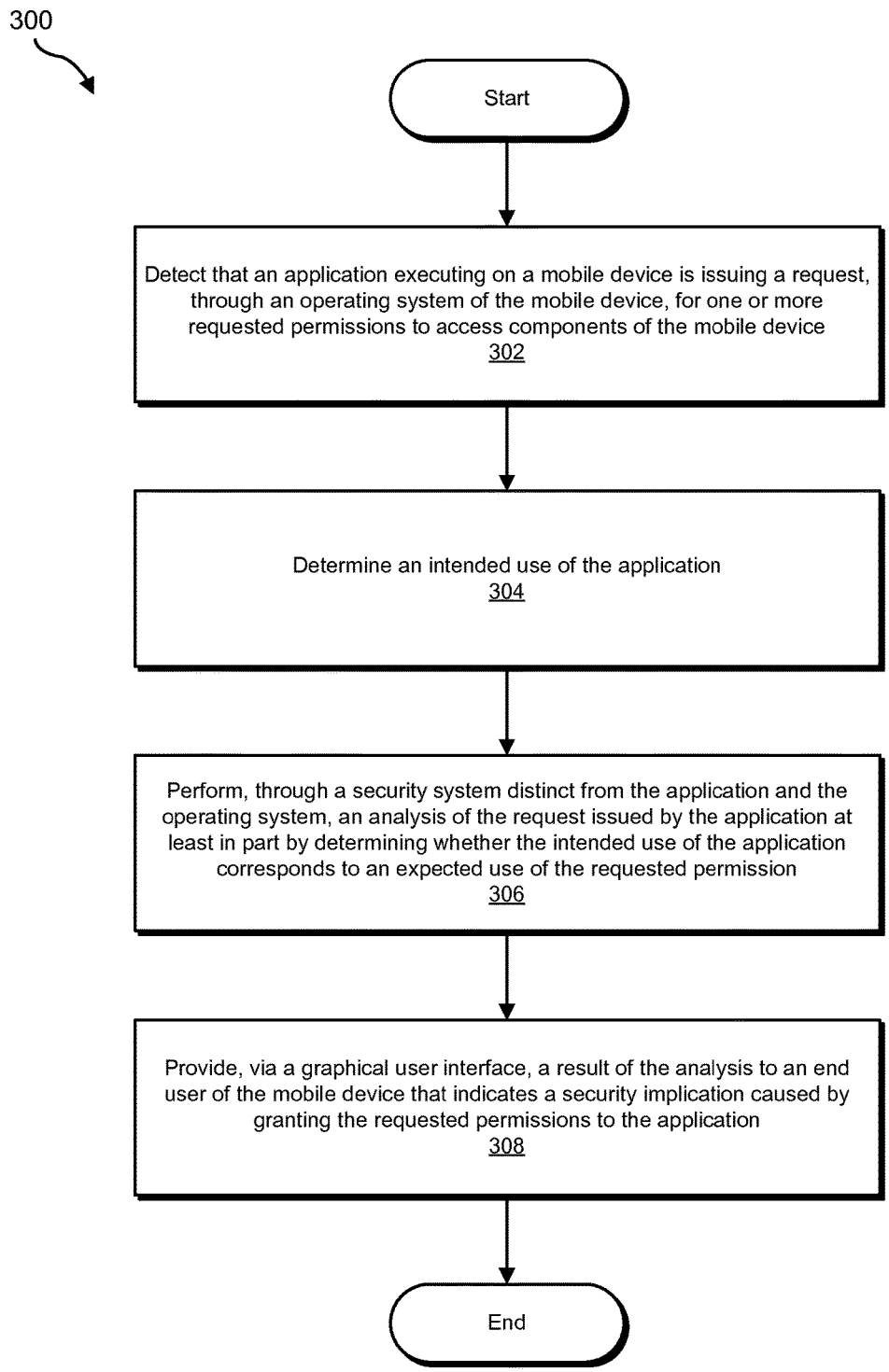
FIG. 3 is a flow diagram of an exemplary method for classifying permissions on mobile devices.

FIG. 3 is a flow diagram of an exemplary computer-implemented method 300 for classifying permissions on mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect that an application executing on a mobile device is issuing a request for one or more requested permissions to access one or more components of the mobile device. For example, detection module 104 may, as part of mobile device 202 in FIG. 2, detect that application 208 executing on mobile device 202 is issuing request 210, through operating system 212 of the mobile device, for requested permission 214 to access component 216 of mobile device 202.

Detection module 104 may detect that the application is requesting the permission in a variety of ways. For example, detection module 104 may receive a notification from security system 218 that application 208 is requesting requested permission 214. Additionally or alternatively, detection module 104 may receive the notification from operating system 212. In some embodiments, detection module 104 may execute as part of a third party library that intercepts permission requests on mobile device 202. Additionally or alternatively, detection module 104 may operate as part of security system 218.

Detection module 104 may detect that requested permission 214 is requesting access to a variety of components of the mobile device. For example, requested permission 214 may grant access to information stored on the mobile device (e.g., photos, contacts lists, device information, etc.), one or more hardware components of the mobile device (e.g., camera, microphone, etc.), a network interface of the mobile device (e.g., a BLUETOOTH or other wireless interface), and/or an application programming interface of the mobile device. In some embodiments, detection module 104 may additionally or alternatively differentiate between permission requests that originate from within the application versus permission requests that originate from a third-party library.

At step 304 in FIG. 3, one or more of the systems described herein may determine an intended use of the application. For example, determination module 106 may, as part of mobile device 202 in FIG. 2, determine an intended use of application 208.

In some embodiments, determination module 106 may determine the intended use of the application prior to detection module 104 detecting the request for the permission. For example, determination module 106 may operate as part of a security backend (e.g., security system backend 502 in FIG. 5) that continuously classifies popular applications (or any other set of applications) so that intended use information is rapidly available upon request. In other embodiments, determination module 106 may determine the intended use of the application in response to detection module 104 detecting the request. For example, determination module 106, operating as part of security system 218, may query an application store that hosts application 208 in response to detection module 104 detecting request 210. As will be described in greater detail below, determination module 106 may alternatively execute as part of a security system backend.

In either case, determination module 106 may determine an intended use of the application in a variety of ways. For example, determination module 106 may identify an application intent category of application 208. In some embodiments, determination module 106 may additionally or alternatively determine an intent category of the requested permission. In some examples, determination module 106 may identify the intent category of the permission and/or application by performing a static analysis of the code of the application. Additionally or alternatively, determination module 106 may query an application store that hosts the application. The organization that operates the application store may have previously identified intent categories for the permission and/or application and may provide this information to determination module 106 upon request.

The term "intent category," as used herein, refers to a broad classification of applications or permissions that share a similar intended use. In some examples, an application may be assigned to a single application intent category. For example, the applications SNAPCHAT and INSTAGRAM both capture and share photographs. These two applications may accordingly share one or more application intent categories, such as "social media" and/or "mobile device photos." Application permissions may also be sorted into intent categories. For example, determination module 106 may classify permission to access a device's camera under the "video recording" intent category. In general, applications of the same intent categories will tend to request similar categories of permissions.

At step 306 in FIG. 3, one or more of the systems described herein may perform, through a security system distinct from the application and the operating system, an analysis of the request issued by the application at least in part by determining whether the intended use of the application corresponds to an expected use of the requested permission. For example, performing module 108 may, as part of mobile device 202 in FIG. 2, perform, through security system 218, an analysis of request 210 issued by application 208 at least in part by determining whether the intended use of application 208 corresponds to an expected use of requested permission 214.

Performing module 108 may analyze request 210 in a variety of ways. While various instances of an application generally request the same permissions, some users do not update their software to the most recent version. As such, some instances of an application may request different permissions than others. For example, an old version of FACEBOOK MESSENGER may not have video messaging functionality, while newer versions do possess video messaging functionality. As such, the older version is unlikely to ever request access to a device's camera, but such access may nevertheless be necessary for more recent versions of the application to function. Furthermore, an application may not request a permission until a user attempts to access functionality that requires the permission. For example, the FACEBOOK MESSENGER application for APPLE 105 may not request access to a device's stored images until a user tries to send an image through the application. Addressing these confounding factors may involve a variety of analysis techniques in order to provide meaningful context information to end-users.

In some examples, performing module 108 may perform the analysis of the request by comparing permissions requested by a previous version of the application to permissions requested by a current version of the application. An application is unlikely to change what permissions it requests, even after updating. Accordingly, performing module 108 may determine that newly requested represent a potential security threat or information leak. As a specific example, one version of the UBER mobile application may request access to a phone number and location of a mobile device. However, after updating, an instance of the application may request access to the device's International Mobile Subscriber Identity (IMSI). Performing module 108 may identify this request for the device's IMSI as a new permission request and accordingly flag the permission request as potentially harmful to the user.

In some embodiments, performing module 108 may perform the analysis of the request by determining, across multiple mobile devices, a frequency at which instances of the application request the requested permission. Permissions that are requested by instances of an application above a particular frequency threshold are likely to be required for the application to operate correctly. Permissions requested below a certain frequency threshold may indicate a compromised application instance or other anomalous behavior. Permissions that do not satisfy either threshold may require further analysis.

Performing module 108 may additionally or alternatively perform the analysis of the request by determining, across multiple mobile devices, a frequency at which instances of the application utilize the requested permission. For example, performing module 108 may track how often instances of a particular application actually use the permissions that they request. Performing module 108 may then indicate that permissions that frequently go unused by the applications requesting them are unlikely to negatively impact proper operation of those applications. Returning to the above-described scenario of the UBER application, instances of the UBER application may request, but not utilize, access to a device's IMSI. In this case, performing module 108 may indicate that an end user may safely deny the UBER application access to their device's IMSI, and that denying this permission is unlikely to negatively impact expected operation of the application.

In some examples, systems described herein may compile a list of permissions requested by instances of the application that each executed on a separate mobile device. In these examples, performing module 108 may search the compiled list of permissions requested in order to determine whether any instance has previously requested the requested permission. For example and as will be described in greater detail below, all or a portion of performing module 108 may operate as part of a backend server that provides security analysis capabilities for a collection of mobile devices. In such an example, performing module 108 may maintain on the server a database of applications in association with permissions requested by various instances of those applications. When asked to perform an analysis on a request for permissions, performing module 108 may search the database for the application that issued the request and determine if the requested permissions have been previously requested by any other instance of the application. If other instances of the application have not previously requested the requested permissions, the request may indicate that that particular instance of the application has been compromised in some way.

In some examples, performing module 108 may additionally record in the database the frequency with which various permissions are requested by various applications. In these examples, performing module 108 may use any number of thresholds for determining whether or not granting a particular permission to an application is likely to cause security issues for the end user, or whether or not denying a particular permission is likely to negatively impact the performance of an application. For example, performing module 108 may clear a permission as unlikely to cause security issues if a simple majority of application instances request the permission. Alternatively, performing module 108 may require that a certain threshold percentage of application instances request the permission before clearing the permission as unlikely to cause security problems. Performing module 108 may additionally maintain the database in a variety of other ways in order to ensure that the database represents an accurate record of permissions that should be allowed. For example, performing module 108 may delete permission request records that are older than a specified amount of time and/or delete permission request records that represent permission requests that are not requested above a predetermined threshold.

In some embodiments, determination module 106 may have determined an intent category for the application and/or the requested permission. In such embodiments, performing module 108 may compare the permission intent category to the application intent category. Applications of a particular intent category may be expected to request certain categories of permission. For example, a photo-sharing application assigned to the "social media" and "photography" intent categories, (e.g., FACEBOOK MESSENGER) might reasonably be expected to request permissions assigned to "image acquisition" intent categories. Examples of such permissions include, for example, access to images stored on a mobile device and/or access to a camera that is part of the mobile device. Performing module 108 may thus determine that granting FACEBOOK MESSENGER access to permissions that fall under one of these permission intent categories are unlikely to cause negative security implications.

Similarly, performing module 108 may determine that granting permissions of a particular intent category are in fact likely to cause negative security implications. For example, access to a device's International Mobile Subscriber Identity (IMSI) may be classified under the "network identifiers" intent category. An application that has no need for access to such things, such as a mobile game, would be unlikely to need access to an IMSI in order to function properly. As such, performing module 108 may flag a mobile game requesting access to a device's IMSI as potentially causing negative security implications.

Permission intent categories that are or are not likely to cause security implications may vary by application. Some applications, such as crash report handling, may require access to a device's identifying information in order to properly address the problem. However, other applications, such as social media applications, should not be granted access to a device's identifying information because there is no need for them to have access to such information.

Some embodiments of systems and methods described herein may compile a list of permissions requested by other applications that are classified under the same intent category as the application. In such embodiments, performing module 108 may search this list of permissions to determine whether any of the other applications in the application intent category have previously requested the requested permission. Performing module 108 may use any number of metrics in determining whether or not granting a permission is likely to cause security implications and/or impact performance of the application. For example, performing module 108 may clear permissions that are requested over a threshold frequency across applications in the intent category as likely to be safe and/or required. This process may be particularly useful in circumstances when a particular permission does not have a known or assigned intent category, or if a security system is attempting to determine whether or not an application is exhibiting potentially malicious activity. As a specific example, FACEBOOK MESSENGER might be classified as a "social media" application. Other applications in the "social media" application intent category may frequently request access to photos stored on the mobile device that they are operating on. Accordingly, performing module 108 may determine that granting FACEBOOK MESSENGER access to photos stored on a mobile device is unlikely to present a security risk and may in fact be necessary for expected operation of FACEBOOK MESSENGER.

In some embodiments, performing module 108 may communicate with a security system on the mobile device to identify the application as requesting an anomalous set of permissions, enabling the security system to quarantine or otherwise address the potential problems presented by the compromised mobile application. As will be described in greater detail below, performing module 108 may also provide information to providing module 110 in order to communicate the presence or absence of security implications to the end user.

At step 308, one or more of the systems described herein may provide, via a graphical user interface, a result of the analysis to an end user of the mobile device that indicates a security implication caused by granting the one or more requested permissions to the application. For example, providing module 110 may, as part of mobile device 202 in FIG. 2, provide, via user interface 220, a result of the analysis to an end user of mobile device 202 that indicates a security implication caused by granting requested permission 214 to application 208.

Providing module 110 may provide a variety of information to the end user. As described in greater detail above, performing module 108 may determine a variety of information about a permission, including but not limited to whether or not granting the permission is safe, if the permission required for operation of the application, if the permission is used by the application itself or a third-party library, and/or if denying the permission might negatively impact operation of the application. Providing module 110 may display this information through colored markers on a display of the mobile device, e-mail a report to the end user of the mobile device, send a text message with this information to the end user of the mobile device, or deliver the information in any other suitable fashion.

Figure 4:
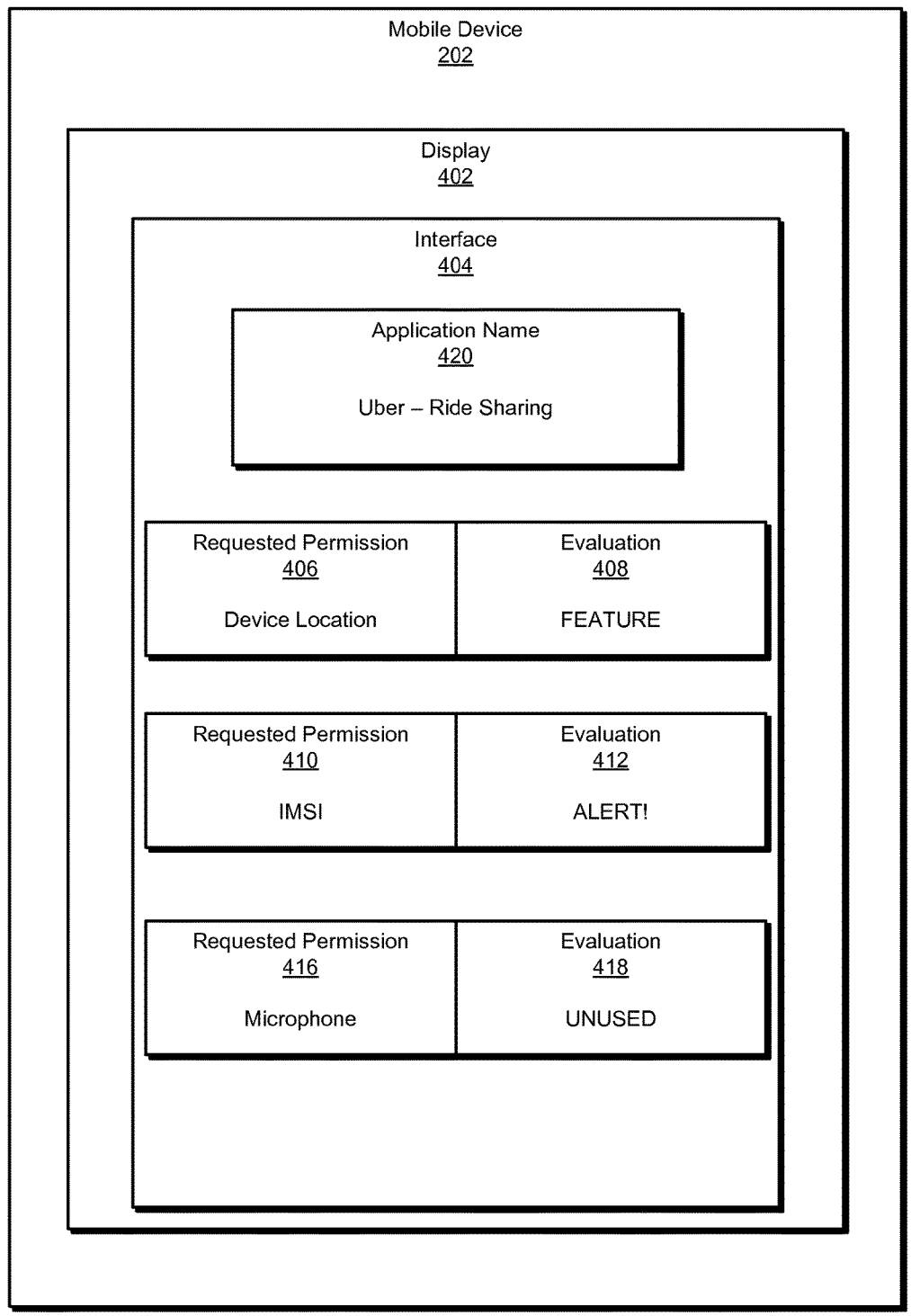
FIG. 4 is a block diagram of an exemplary user interface for communicating security implications of permissions to end users.

An illustrated example user interface that might display on the screen of a mobile device is provided in FIG. 4. As illustrated in FIG. 4, mobile device 202 includes a display 402 that presents an interface 404 to the user. Interface 404 displays information derived by performing module 108 about permissions requested by an application. In this example, interface 404 includes an application name 420, "UBER," as well as an intent category, "ride sharing," of the application. Interface 404 also displays several permissions being requested by the application. As illustrated in FIG. 4, the application is requesting requested permissions 406, 410, and 414 for device location, device IMSI, and device microphone, respectively. As described in greater detail above, performing module 108 may have determined that device location is integral to the expected functioning of the UBER application, and as such providing module 110 may cause interface 404 to display an evaluation 408 that requested permission 406 is a "FEATURE" of the application. Similarly, performing module 108 may have determined that requested permission 410 for the device's IMSI represents a potential security threat, leading to an evaluation 412 of "ALERT!" As a third example, performing module 108 may have determined that instances of the UBER application that request access to a device's microphone generally do not utilize the permission, leading to an evaluation 418 of "UNUSED."

Figure 5:
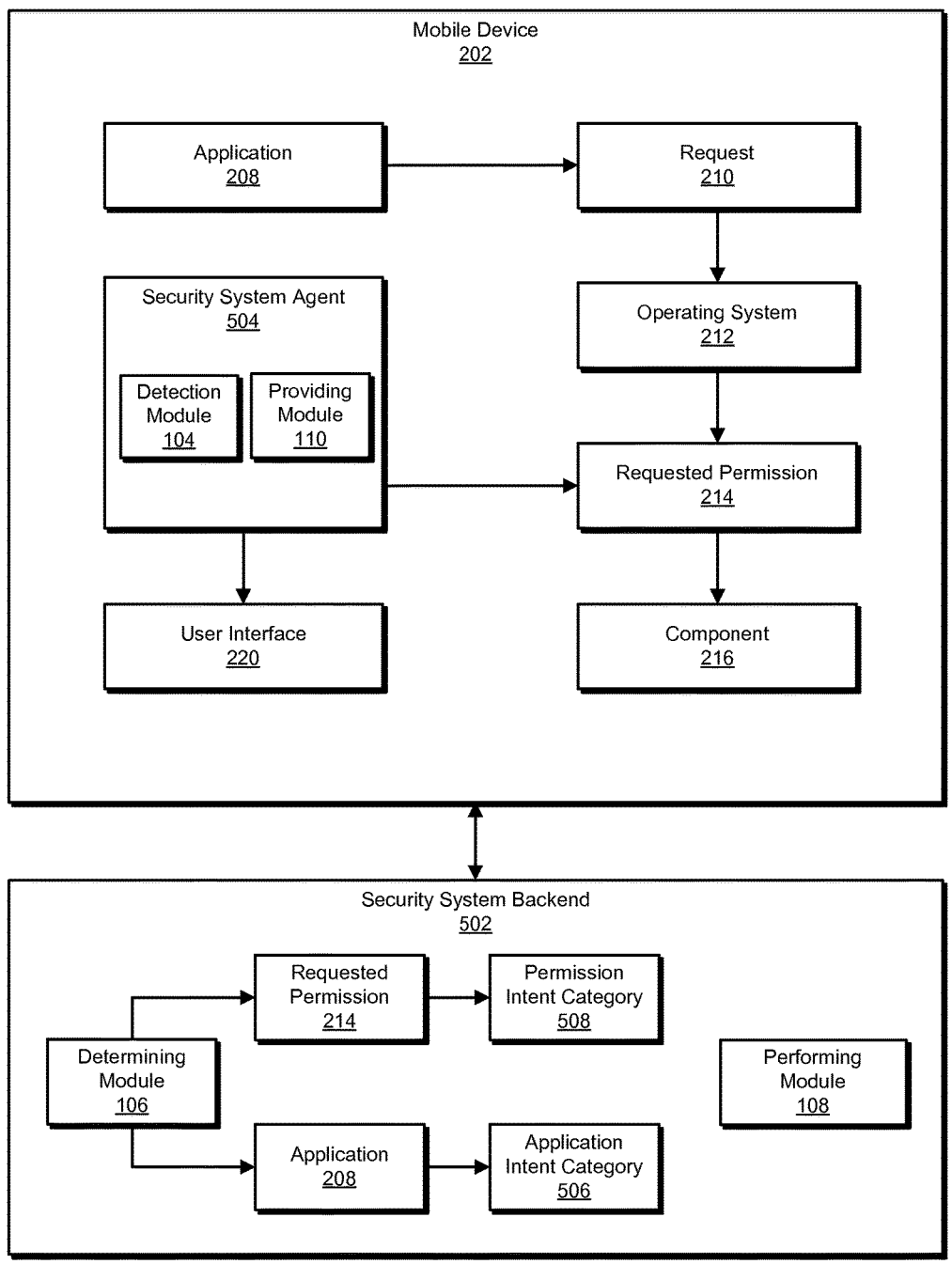
FIG. 5 is a block diagram of an exemplary computing system for classifying permissions on mobile devices using a security system backend.

In some examples, one or more of modules 102 may execute as part of a backend security system that provides analysis capabilities for a mobile security application. As illustrated in FIG. 5, mobile device 202 may be in communication with a security system backend 502 via a network (not illustrated).

Security system backend 502 generally represents any type or form of computing device that is capable of capable of analyzing application permission request data gathered from a collection of devices. Examples of security system backend 502 include, without limitation, application servers and database servers configured to provide various database services and/or run certain software applications. Security system backend 502 may communicate with various devices through a network (not illustrated). Examples of such a network include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. The network may facilitate communication or data transfer using wireless or wired connections.

Security system backend 502 may provide analysis services for a collection of mobile devices (also not illustrated), such as those that subscribe to an application security service, and execute one or more of modules 102, such as determining module 106 and performing module 108. As described in greater detail above, determining module 106 may, as part of security system backend 502, analyze requested permission 214 to assign requested permission 214 to a permission intent category 508. Similarly, determining module 106 may analyze application 208 via static code analysis and/or querying an application store that hosts application 208 in order to assign an application intent category 506 to application 208.

Security system backend 502 may receive telemetry data and permission request metrics from a security system agent 504 that executes on mobile device 202 and may record this telemetry in a database of permissions requested by application 208, as described in greater detail above. Security system agent 504 may include detection module 104 and providing module 110, and, via detection module 104, detect that application 208 is issuing a request 210 through operating system 212 of mobile device 202 for requested permission 214 to access component 216. Security system agent 504 may provide information about request 210 to performing module 108 on security system backend 502 and receive an evaluation about request 210 to be displayed via providing module 110 on user interface 220.

Although the exemplary embodiments described herein are generally directed towards providing information about application permissions with respect to mobile devices, the systems and methods described herein could also be applied to screening permissions in other contexts as well. For example, an application running on a desktop computer may seek permission from the computer's operating system to access a webcam. The systems and methods described herein may detect this request, determine an intended use of the application, analyze the request, and provide a report to an end user of the desktop computer.

As described in greater detail above, the systems and methods described herein may enable end users to make informed decisions about what permissions should or should not be granted to an application. For example, by comparing an intended use of the permission to an intended use of the application, systems and methods described herein may identify possible security implications that might be caused by granting an application access to the requested permission. By presenting this information to an end user via a graphical interface, the systems and methods described herein may allow users to make informed decisions about which permissions they should or should not grant to applications executing on their mobile devices.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for classifying permissions on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive permission request information to be transformed, use the permission request information to identify an intended use of the requested permission, compare the intended use of the requested permission to an intended use of the application requesting the permission, store the permission request information to a database, and output a result of the comparison to a user interface such as the screen of a mobile device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for classifying permissions on mobile devices, at least a portion of the method being performed by a computing device comprising at least one processor, the method comprising:
   detecting, by the at least one processor, that an application installed and executing on a mobile device is issuing a request, through an operating system of the mobile device, for one or more requested permissions to access one or more components of the mobile device that would otherwise be blocked by the operating system of the mobile device;
   determining, by the at least one processor, an intended use of the application;
   in response to detecting that the application is issuing the request, performing, by the at least one processor and through a security system distinct from the application and the operating system, an analysis of the request being issued by the application at least in part by determining whether the intended use of the application corresponds to an expected use of the one or more requested permissions; and
   providing, by the at least one processor via a graphical user interface and prior to an end user of the mobile device granting the one or more requested permissions to the application, a result of the analysis to the end user of the mobile device that indicates a security implication that would be caused by the end user granting the one or more requested permissions to the application.

2. The method of claim 1, wherein performing the analysis comprises:
   identifying a permission intent category of the requested permission that describes the expected use of the requested permission;
   identifying, based at least in part on the intended use of the application, an application intent category of the application that classifies applications that are similar to each other by intended use; and
   comparing the permission intent category to the application intent category.

3. The method of claim 1, wherein determining the intended use of the application comprises at least one of:
   performing a static analysis of code of the application; and
   querying an application store that hosts the application.

4. The method of claim 1, wherein performing the analysis of the request comprises determining, across a plurality of mobile devices, at least one of:
   a frequency at which instances of the application request the requested permission; and
   a frequency at which instances of the application utilize the requested permission.

5. The method of claim 1, wherein performing the analysis of the request comprises comparing permissions requested by a previous version of the application to permissions requested by a current version of the application.

6. The method of claim 1, further comprising compiling a list of permissions requested by a plurality of instances of the application that each executed on a separate mobile device, wherein performing the analysis of the request comprises determining, by searching the list of permissions, whether any application instance has previously requested the requested permission.

7. The method of claim 1, further comprising compiling a list of permissions requested by other applications that are classified under a same intent category as the application, wherein performing the analysis of the request comprises determining, by searching the list of permissions, whether any of the other applications have previously requested the requested permission.

8. The method of claim 1, wherein the component of the mobile device comprises at least one of:
   information stored on the mobile device;
   a hardware component of the mobile device;
   a network interface of the mobile device; and
   an application programming interface of the mobile device.

9. The method of claim 1, wherein performing the analysis of the request comprises determining that denying access to the requested permission will not adversely affect intended operation of the application.

10. The method of claim 1, wherein the result of the analysis comprises a trust score for the requested permission that indicates a level of confidence in the requested permission being safe to grant to the application.

11. A system for classifying permissions on mobile devices, the system comprising:
    a detection module, stored in a memory of the system, that detects that an application installed and executing on a mobile device is issuing a request, through an operating system of the mobile device, for one or more requested permissions to access one or more components of the mobile device that would otherwise be blocked by the operating system of the mobile device;
    a determination module, stored in the memory, that determines an intended use of the application;
    a performing module, stored in the memory, that, in response to detecting that the application is issuing the request, performs, through a security system distinct from the application and the operating system, an analysis of the request issued by the application at least in part by determining whether the intended use of the application corresponds to an expected use of the one or more requested permissions;
    a providing module, stored in the memory, that provides, via a graphical user interface and prior to an end user of the mobile device granting the one or more requested permissions to the application, a result of the analysis to the end user of the mobile device that indicates a security implication that would be caused by the end user granting the one or more requested permissions to the application; and
    at least one physical computing processor configured to execute the detection module, the determination module, the performing module, and the providing module.

12. The system of claim 11, wherein the performing module:
    identifies a permission intent category of the requested permission that describes the expected use of the requested permission:
    identifies an application intent category of the application that classifies applications that are similar to each other by intended use; and compares the permission intent category to the application intent category.

13. The system of claim 11, wherein the determination module determines an intended use of the application by at least one of:
   performing a static analysis of code of the application; and
   querying an application store that hosts the application.

14. The system of claim 11, wherein the performing module performs the analysis of the request by determining, across a plurality of mobile devices, at least one of:
   a frequency at which instances of the application request the requested permission; and
   a frequency at which instances of the application utilize the requested permission.

15. The system of claim 11, wherein the performing module performs the analysis of the request by comparing permissions requested by a previous version of the application to permissions requested by a current version of the application.

16. The system of claim 11:
   further comprising a compiling module, stored in memory, that compiles a list of permissions requested by a plurality of instances of the application that each executed on a separate mobile device; and
   wherein the performing module performs the analysis of the request by determining, by searching the list of permissions, whether any application instance has previously requested the requested permission.

17. The system of claim 11:
   further comprising a compiling module, stored in memory, that compiles a list of permissions requested by other applications that are classified under a same intent category as the application; and
   the performing module performs the analysis of the request by determining, by searching the list of permissions, whether any of the other applications have previously requested the requested permission.

18. The system of claim 11, wherein the component of the mobile device comprises at least one of:
   information stored on the mobile device;
   a hardware component of the mobile device;
   a network interface of the mobile device; and
   an application programming interface of the mobile device.

19. The system of claim 11, wherein the performing module performs the analysis of the request by determining that denying access to the requested permission will not adversely affect intended operation of the application.

20. A non-transitory computer-readable medium comprising one or more computer-readable instructions that, when executed by at least one processor of a computing device, cause the computing device to:
   detect, by the at least one processor, that an application installed and executing on a mobile device is issuing a request, through an operating system of the mobile device, for one or more requested permissions to access one or more components of the mobile device that would otherwise be blocked by the operating system of the mobile device;
   determine, by the at least one processor, an intended use of the application;
   in response to detecting that the application is issuing the request, perform, by the at least one processor and through a security system distinct from the application and the operating system, an analysis of the request being issued by the application at least in part by determining whether the intended use of the application corresponds to an expected use of the one or more requested permissions; and
   provide, by the at least one processor via a graphical user interface and prior to an end user of the mobile device granting the one or more requested permissions to the application, a result of the analysis to the end user of the mobile device that indicates a security implication that would be caused by the end user granting the one or more requested permissions to the application.

* * * * *